Jan. 11, 1938.  J. C. SMITH  2,105,378
METHOD OF AND APPARATUS FOR DECORATING SPHERICAL AND OTHER
ARTICLES HAVING CURVED SURFACES BY A STENCILING PROCESS
Filed Sept. 9, 1936    2 Sheets-Sheet 1
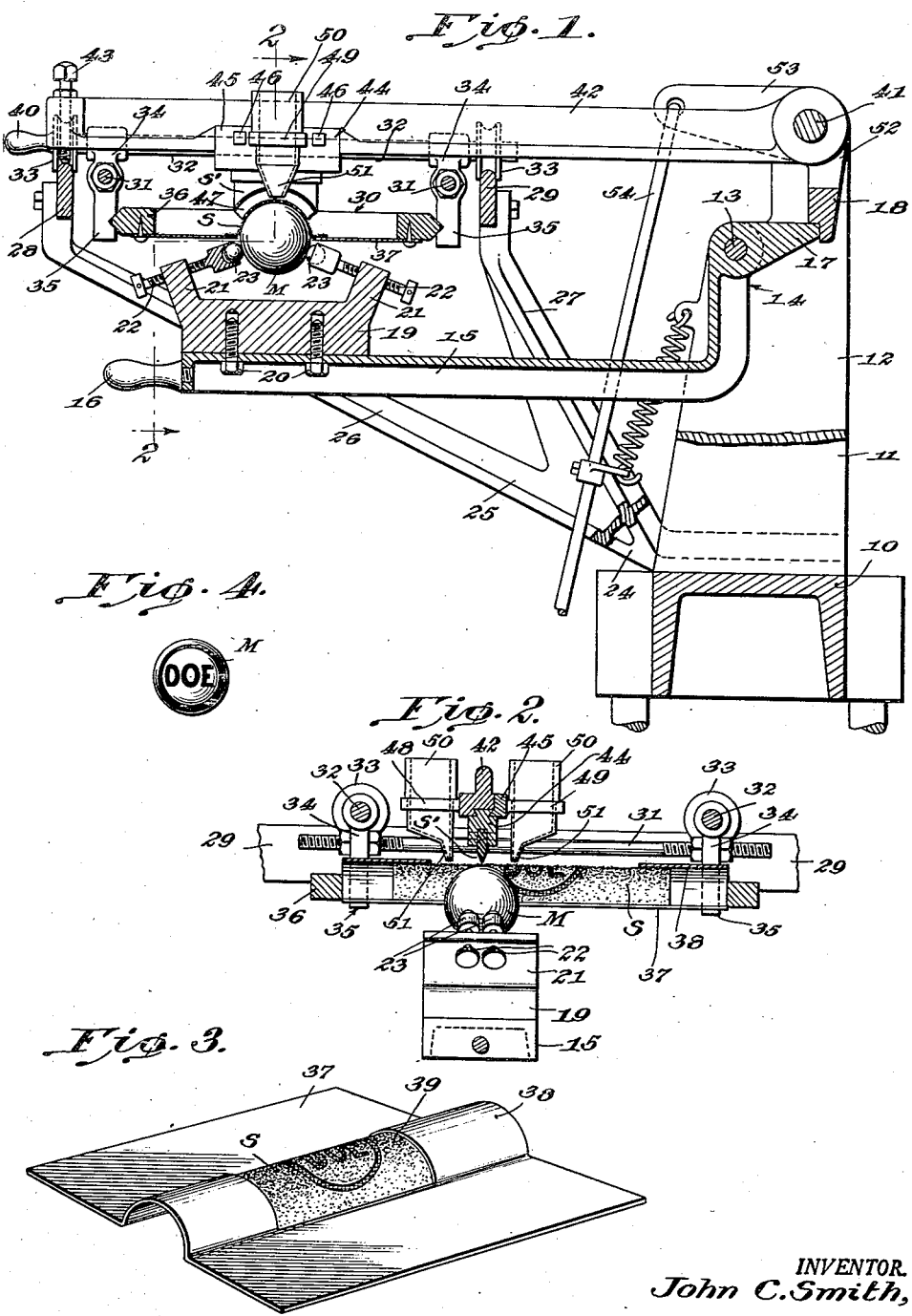
INVENTOR.
John C. Smith,
BY Rule & Hoge
ATTORNEYS.

Jan. 11, 1938. J. C. SMITH 2,105,378
METHOD OF AND APPARATUS FOR DECORATING SPHERICAL AND OTHER
ARTICLES HAVING CURVED SURFACES BY A STENCILING PROCESS
Filed Sept. 9, 1936 2 Sheets-Sheet 2

INVENTOR.
John C. Smith,
BY Rule & Hoge
ATTORNEYS.

Patented Jan. 11, 1938

2,105,378

UNITED STATES PATENT OFFICE 2,105,378

METHOD OF AND APPARATUS FOR DECORATING SPHERICAL AND OTHER ARTICLES HAVING CURVED SURFACES BY A STENCILING PROCESS

John C. Smith, Beaver, Pa., assignor to Solar Laboratories, a corporation of Pennsylvania Application September 9, 1936, Serial No. 99,932

10 Claims. (Cl. 101—124)

The method of and apparatus for decorating articles comprising the present invention are primarily adapted for use in applying to a spherical article, or to an article having a curved surface, a decoration, design, lettering, symbol or other mark by a stenciling process.

The invention is susceptible to modification and may, with or without modification, be employed for applying a decoration or the like to spherical articles such as marbles, balls and similar objects, or to light globes, bottles, door knobs, vases and a variety of such articles which are provided with simple or compound curved or irregular surfaces.

The invention is embodied in an apparatus of the type employing a stencil screen capable of movement relative to the article undergoing decoration and having permeable portions through which a vitreous enamel composition is transferred to the articles by the spreading action of a squeegee.

The principal object of the invention is to provide an apparatus of the type set forth above in which provision is made for supporting a spherical article or an article having an exterior surface generated by the revolution of a simple or compound curved or irregular line about an axis in such a manner that it is free to rotate, while at the same time a stencil screen, the curvature of which is the same as the curvature of the surface to be decorated is moved in rolling tangential line contact with the article and, during which movement, decorating material is forced through the pervious portions provided on the screen and onto the article by the spreading action of a squeegee having a similarly curved contact surface.

Other objects of the invention will become more readily apparent hereinafter.

In the accompanying drawings:

Fig. 1 is a side elevational view, partly in section, of a stenciling apparatus manufactured in accordance with the principles of the present invention;

Fig. 2 is a sectional view taken substantially along the line 2—2 of Fig. 1;

Fig. 3 is a perspective view of a stencil screen and screen holder employed in connection with the form of the invention shown in Fig. 1;

Fig. 4 is a view of a spherical object that has been decorated by the present apparatus;

Fig. 5 is a fragmentary side elevational view, partly in section, of a modified form of the apparatus designed for decorating the neck portions of a tea pot or the like;

Figure 5:
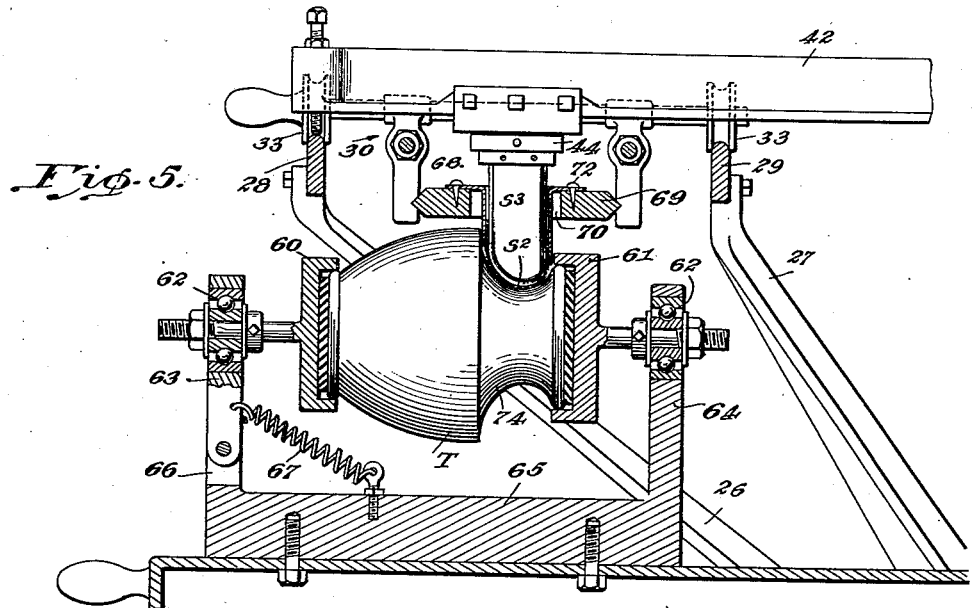

The form of the invention shown in Figs. 1, 2 and 3 is designed for use in applying a decoration to a marble M as shown in Fig. 4. The apparatus involves in its general organization a base or support 10 from which there projects upwardly a pair of closely spaced standards 11 and 12 that support therebetween a transverse horizontal rock shaft 13. An article support 14 is rockably supported on the rock shaft 13 adjacent its inner or rear end and consists of a forwardly extending arm 15 provided with a handle 16 at the forward extremity thereof. A latch engaging arm 17 projects rearwardly from the rear end of the support 14 and is adapted to engage a latch member 18 which projects into its path and which, by its engagement with the latch engaging arm 17, serves to maintain the arm 15 in a substantial horizontal position.

An article supporting block 19 is secured by means of cap screws 20 to the arm 15 adjacent its forward end. The block is provided with a pair of spaced upstanding lugs 21, through each of which lugs there are threaded a pair of article centering screws 22, each centering screw having an article engaging anti-friction member 23 nested in its inner end. The spherical marble M to be decorated is supported between the anti-friction members 23 for free universal rotation thereon. The centering screws 22 may, by virtue of their threaded engagement with the lugs 21, be adjusted to accommodate marbles or other spherical articles of different sizes and may also be adjusted to raise or lower the elevation of the articles undergoing decoration without interfering with their freedom of movement.

A pair of widely separated supporting members 24 and 25, (Fig. 1) which are secured to the support 10 on opposite sides of the standards 11 and 12, are each provided with forwardly and upwardly extending diverging arms 26 and 27, the arms 26 and 27 of each supporting member serving to support therebetween a horizontal transverse track, which tracks are designated at 28 and 29, respectively, and are disposed at substantially the same level in the apparatus.

A horizontally reciprocable stencil screen carriage 30 in the form of a rectangular frame having side bars 31 and end bars 32, the latter bars carrying supporting wheels 33, is tractionally supported on the tracks 28 and 29 and is capable of movement therealong from one side of the apparatus to the other. The side bars 31 are connected to the end bars 32 by means of suitable corner fastenings 34. Each corner fastening is provided with an integrally formed depending lug 35, between which lugs there is supported or clamped a substantially rectangular stencil screen frame 36. A stencil screen plate 37, generally of rectangular contour and provided with a medial curved portion 38 is secured to the underneath side of the frame 36 and occupies a generally horizontal position in the apparatus. The plate 37 is provided with a central opening 39 and a stencil screen S is secured in any suitable manner, as, for example, by gluing, to the margin of the opening 39 in such a manner as to conform to the curvature of the arcuate portion 38. The radius of curvature of the curved portion 38 and screen S is substantially equal to the radius of curvature of the marble M. The screen frame 36 is maintained at a level which will normally bring the screen S into tangential line contact with the surface of the marble M.

The end bars 32 are provided with operating handles 40 at their forward ends to facilitate reciprocation of the screen carriage 30 on the tracks 28 and 29. It will be seen that reciprocation of the carriage 30, when the marble M is in contact with the screen S, will, by frictional engagement between these two members, cause rotation of the marble M on the anti-friction members 23.

A transverse rock shaft 41 is supported at its ends between the standards 11 and 12 above the level of the rock shaft 13. A forwardly extending squeegee arm 42 is rockably supported at its rear end from the rock shaft 41 and its forward end is supported on the track 28 by means of a set screw 43 which passes through the arm 42 and bears against the track 28.

A squeegee holder 44 is suspended from a medial portion of the arm 42 by means of a clamping plate 45 which is secured to the arm 42 by means of clamping bolts 46. A squeegee S' is carried by the holder 44 and is provided with an arcuate wiping edge 47 designed for line contact with the upper curved surface of the stencil screen S. The squeegee S' is centered above the marble M undergoing decoration in such a manner that the arcuate contact surface 47 engages the screen substantially along the line of contact between the screen and marble.

A pair of oppositely extending reservoir supporting arms 48 and 49 are integrally formed on the squeegee arm 42 and clamping plate 45 respectively and each supporting arm serves to support a reservoir 50 in the form of a container provided with a drip spout 51. The reservoirs 50 are adapted to contain a vitreous enamel composition or other suitable paint. The drip spouts 51 are centered on the apex of the curved stencil screen S and occupy positions on opposite sides of the squeegee S' in such a manner that the composition issuing from the spouts 51 will be placed on the moving screen S and will be forced therethrough by the spreading action of the squeegee S'.

The latch member 18 forms one arm of a bell crank lever 52 which is fulcrumed on the rock shaft 41, the other arm 53 thereof being connected through a link 54 to a suitable treadle mechanism (not shown).

In the operation of the apparatus, the operator places a marble to be decorated in position between the centering screws 22 so that the marble is supported between and upon the anti-friction members 23. The article supporting arm 15 is then, with the aid of the handle 16, brought to a horizontal position, the latch 18 tripping over the latch engaging arm 17 and falling into operative holding position. Movement of the stencil screen carriage 30 along the supporting tracks 28 and 29 in one direction or the other forces the enamel composition that is deposited on the upper surface of the stencil screen S as it issues from the drip spouts 51 through the impervious portions of the screen S and onto the marble M. During the decorating operation, as the screen S moves in contact with the marble, the latter is rotated on the anti-friction members 23 by virtue of its frictional engagement with the screen S.

After the decoration has been applied to the marble, the operator depresses the treadle mechanism which controls the operation of the latch 18. The latch is moved from its engagement with the latch engaging arm 17 and the article support 14 is permitted to drop by gravity to a position wherein the decorated article may be conveniently removed from the support and an undecorated marble substituted in its stead.

Figure 6:
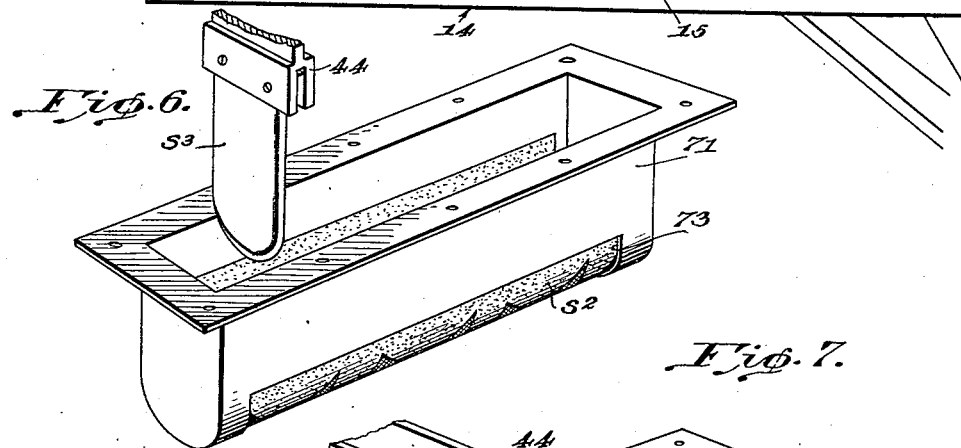
Fig. 6 is a perspective view of the stencil screen and holder therefor, together with the squeegee employed in connection with the form of the apparatus shown in Fig. 5.

In the form of the invention shown in Figs. 5 and 6, a modified form of the apparatus designed for use in decorating circumferential grooves or concave surfaces of revolution on articles such as tea pots, vases and the like is shown. The article T, which in the present instance is in the form of a tea pot, is supported in a cumbent position between a pair of rotary chucks 60 and 61, each of which is supported for rotation in anti-friction bearings 62 carried by a pair of uprights 63 and 64 provided on an article supporting block 65. The chuck 60 is movable toward and away from the chuck 61 to facilitate insertion and removal of the article in and from the chucks. Toward this end the upright 63 is in the form of a pivoted arm, pivotally connected to a lug 66 formed on the block 65. A coil spring 67 serves to maintain the chuck 60 in article engaging position.

The stencil screen assembly 68 consists of a substantially rectangular frame 69 having a central opening 70 through which a trough-like stencil screen holder 71 projects and to the upper side of which the holder is secured by means of tacks 72 or the like. The trough-like holder 71 is provided with an opening 73 and a stencil screen S² is secured to the margin of the opening in such a manner as to conform to the curvature of the trough-like holder. The bottom portion of the trough-like holder 71 and screen S² is curved to conform to the curvature of the concave portion 74 of the article T to be decorated and when the stencil screen assembly 68 is operatively supported in the apparatus the curved bottom portion of the trough-like holder 71 and screen S² make tangential line contact with each other.

A squeegee S³ is suspended from the squeegee holder 44 and projects into the trough-like holder 71 in such a manner as to engage the stencil screen S² along the line of contact between screen and article.

It will be seen that enamel composition or paint placed within the trough will, upon reciprocation of the screen carriage 30 in one direction or the other, cause the composition or paint to be forced through the pervious portions of the screen and onto the article by the spreading action of the squeegee S³.

Figure 7:
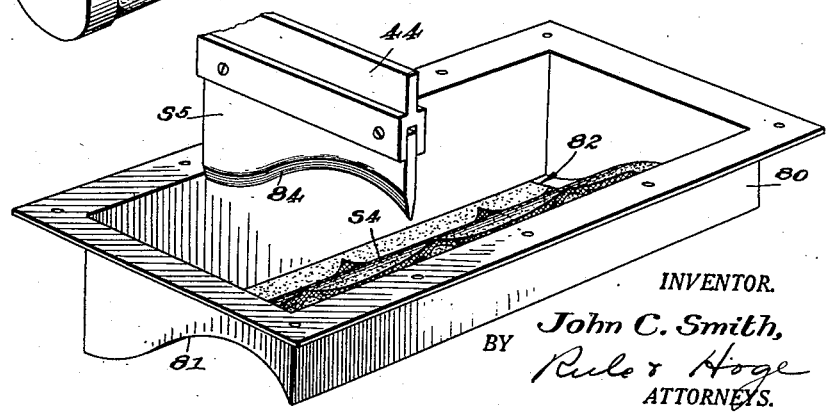
Fig. 7 is a perspective view similar to Fig. 6 showing a still further modified form of squeegee and holder, together with a squeegee designed for decorating the compound curved surface of a vase.

The form of stencil screen holder, screen and squeegee shown in Fig. 7 is designed for decorating articles such as vases, bottles and the like, having compound curved surfaces of revolution. Accordingly, the stencil screen holder 80 is in the form of a trough-like member, the bottom 81 of which is in the form of a compound curve. The bottom 81 is provided with an opening 82 across which the stencil screen S⁴ is stretched in the manner set forth in connection with the screen S² and holder 71. The squeegee 55 is provided with a contact surface 84 which is curved to conform to the curvature of the screen S⁴ and this contact surface 84 is adapted, when the squeegee and screen are in operative decorating position, to engage the screen along the line of contact between the screen and article undergoing decoration. Enamel composition or paint placed on the screen in the trough like holder 80 is, upon reciprocation of the screen carriage 30, forced through the pervious portions of the screen by the spreading action of the squeegee and the decoration is thus applied to the article.

It is pointed out that the terms "semi-cylindrical" and "semi-cylindroidal" as used in the claims are to be construed according to the broad definition thereof, wherein the prefix "semi" relates to a cylindrical or cylindroidal surface that may be in excess of or lesser than one-half of a complete cylinder or cylindroid.

Modifications may be resorted to within the spirit and scope of the appended claims.

I claim:

1. The method of decorating a spherical article which consists in supporting said article for rotation about an axis, placing a semi-cylindrical stencil screen, the radius of curvature of which is equal to the radius of curvature of the article, in tangential line contact with said article, and moving said screen axially while simultaneously forcing coloring material through the interstices thereof by the spreading action of a squeegee.

2. In a stenciling apparatus for decorating spherical articles, in combination, a stencil screen having a semi-cylindroidal surface and a squeegee therefor having a curved spreading edge, the curvature of which corresponds to the curvature of said screen in cross-section.

3. In a stenciling apparatus for decorating spherical articles, in combination, a substantially semi-cylindrical stencil screen and a squeegee therefor having an arcuate spreading edge, the radius of curvature of which is equal to the radius of curvature of said screen.

4. In a stenciling apparatus for applying a vitreous enamel composition to the surface of a spherical article in the decoration thereof, means for supporting an article for rotation about an axis, a horizontally reciprocable stencil screen of arcuate configuration in cross-section, means for moving said rotatably supported article into and out of tangential line contact with said screen, means for reciprocating said screen while in contact with said article, and means for forcing a vitreous enamel composition through said screen and onto said article.

5. In a machine for decorating spherical articles, an arcuate stencil screen having impervious portions and pervious portions, said screen being designed for tangential rolling line contact with a spherical article to be decorated, and means for moving said screen axially.

6. An apparatus for decorating the surface of circumferential grooves or troughs on circular articles, comprising means for supporting an article for rotation about its central axis, a trough-like stencil screen holder, the bottom of which is provided with an opening, a stencil screen extending across said opening, said screen being curved in cross-section and designed for tangential line contact with the groove or trough provided on said article, said supporting means being movable to bring said screen into contact with or to remove said screen from contact with said groove or trough, means for moving said holder and screen transversely of the central axis of said article, and a squeegee having a contact surface or configuration corresponding to the configuration of the cross-sectional interior configuration of said trough-like screen holder, said squeegee projecting into said trough-like screen holder with its contact surface bearing against said screen along the line of contact between said screen and the surface of said article.

7. The method of decorating a spherical article which consists in supporting said article for rotation about an axis, placing a semi-cylindrical stencil screen, the radius of curvature of which is equal to the radius of curvature of the article, in tangential line contact with said article, and moving said screen and article relative to each other while simultaneously forcing coloring material through said screen and onto the article by the spreading action of a squeegee.

8. The method of decorating a spherical article which consists in supporting said article for universal rotation about a fixed point, placing a semi-cylindrical stencil screen, the radius of curvature of which is equal to the radius of curvature of the article, in tangential line contact with said article, and moving said screen axially while simultaneously forcing coloring material through the interstices thereof by the spreading action of a squeegee.

9. The method of decorating a spherical article which consists in supporting said article for universal rotation about a fixed point, placing a semi-cylindrical stencil screen, the radius of curvature of which is equal to the radius of curvature of the article, in tangential line contact with said article, and moving said screen axially while simultaneously maintaining a squeegee having a curved edge, the radius of curvature of which is equal to the radius of curvature of the article, in contact with said screen at the line of contact between said screen and the surface of said article to force coloring material through said screen and onto the surface of said article.

10. The method of decorating an article having a surface which is generated by movement of an irregular line about an axis of revolution which consists in supporting said article for rotation about its central axis, placing a stencil screen, the surface of which is generated by translational movement of a substantially identical irregular line in contact with said surface of the article, and moving said screen axially while simultaneously forcing coloring material through said screen onto said surface by the spreading action of a squeegee.

JOHN C. SMITH.